United States Patent [19]
Charpentier et al.

[11] 3,964,056
[45] June 15, 1976

[54] SYSTEM FOR TRANSFERRING DATA BETWEEN CENTRAL UNITS AND CONTROLLED UNITS

[75] Inventors: Jean Charpentier, Issy-les-Moulineaux; Genevieve Cancian; Francois Selz, both of Paris, all of France

[73] Assignee: International Standard Electric Corporation, New York, N.Y.

[22] Filed: Apr. 8, 1974

[21] Appl. No.: 458,691

[52] U.S. Cl. ................. 340/172.5; 235/153 AE
[51] Int. Cl.² ................. G06F 15/16; G06F 11/04
[58] Field of Search ............... 340/172.5, 146.1 BE; 235/153 AE, 153 AK

[56] References Cited
UNITED STATES PATENTS

| | | | |
|---|---|---|---|
| 3,303,474 | 2/1967 | Moore et al. | 235/153 AE |
| 3,419,849 | 12/1968 | Anderson et al. | 340/172.5 |
| 3,503,048 | 3/1970 | Avsan et al. | 340/172.5 |
| 3,768,074 | 10/1973 | Sharp et al. | 340/172.5 |
| 3,806,887 | 4/1974 | Schulte et al. | 340/172.5 |
| 3,875,390 | 4/1975 | Eccles | 235/153 AE |

*Primary Examiner*—Joseph F. Ruggiero
*Attorney, Agent, or Firm*—J. B. Raden; D. P. Warner

[57] ABSTRACT

A system is disclosed for directing orders to peripheral devices in a data processing system having duplicate central control units. In the event one of the central control units loses access to a peripheral device, and therefore cannot transmit orders to that peripheral device, the system enables an alternative route through the other central control unit to the same peripheral device.

3 Claims, 5 Drawing Figures

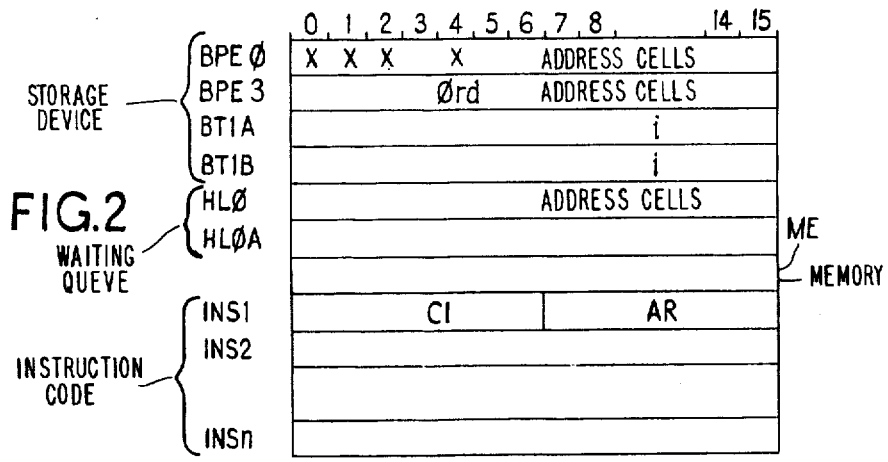
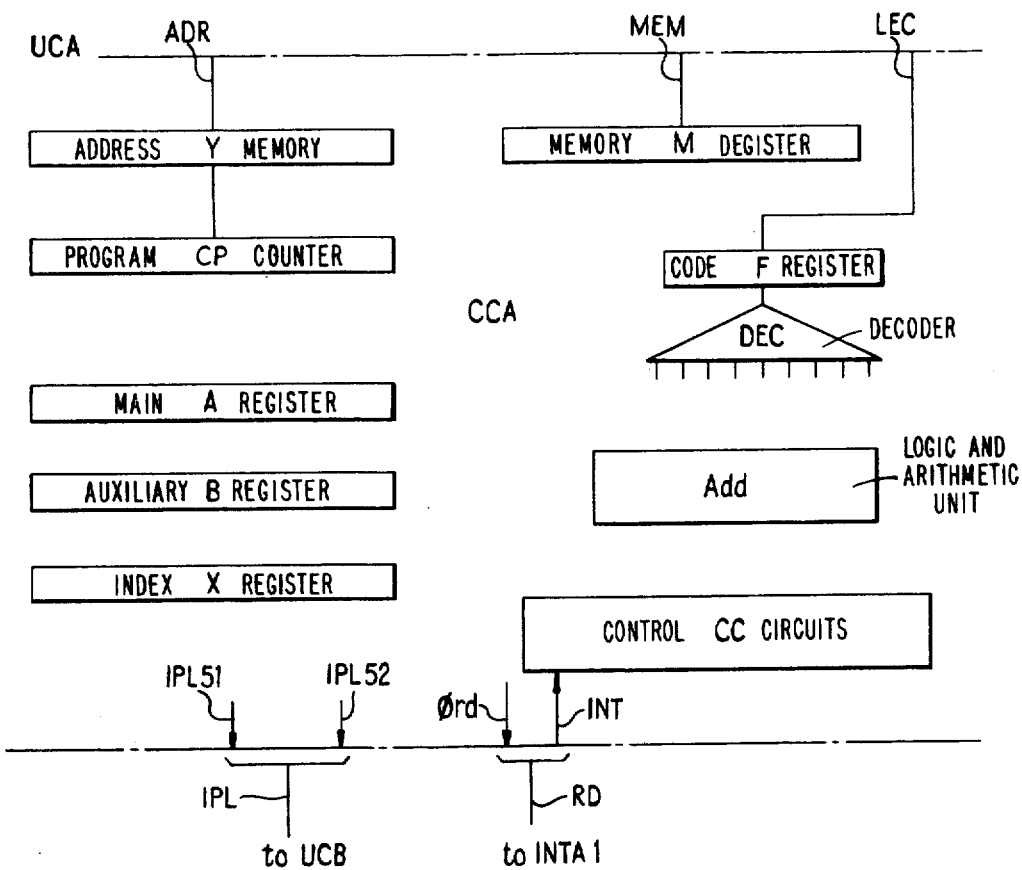

SYSTEM FOR TRANSFERRING DATA BETWEEN CENTRAL UNITS AND CONTROLLED UNITS

BACKGROUND OF THE INVENTION

1. Field of the Invention

The invention relates to a switching system for transferring data between central units and controlled units. The system is applicable to telephone, telegraph, remote control, or, other data-processing installations employing at least two central data processing units having common access to various controlled units. In particular, means are provided to route signals through a second central unit to peripheral equipment when a first central unit cannot reach a peripheral unit directly.

.2. Description of the Prior Art

In such installations there are provided, between the central units and the controlled units, peripheral units receiving orders from the central units and retransmitting them to the controlled units. The presence of the peripheral units is justified by the large number of controlled units and by requirements for adaptation of the speeds of the operation. The controlled units are divided into groups and each central unit has access to each group through a peripheral unit proper to it.

It is possible in such systems for a peripheral unit to fail and prevent the central unit — to which it is linked — from transmitting order to the corresponding group of controlled units and this will prevent calls, put through with the help of this central unit, from reaching their destination.

SUMMARY OF THE INVENTION

It is advisable to remedy such a situation. The present invention provides to that end a system which enables a central unit — when a peripheral unit is failing — to transmit orders, intended for the corresponding controlled units, through the other central unit and through the other peripheral unit associated with these same controlled units.

This system comprises two central units, several groups of controlled units, and, peripheral units at the rate of one peripheral unit per group of controlled units and per central unit, receiving orders from the central units and retransmitting them to the controlled units. The two central units are connected by a link of data transmission, and each central unit comprises central control circuits. This system is characterized by the fact that each central unit comprises a first storing device per peripheral unit assigned to the central unit for storing an information which indicated whether the corresponding peripheral unit is accessible by the central unit or not. In this way, when a central unit is preparing to transmit an order to a peripheral unit, the central control circuits read the information provided by the storing device which corresponds to the peripheral unit and, according to the read information, controls either the transmission of the order directly to the peripheral unit, or, the transmission to the other central unit — through the transmission link — of a message containing the order and the identity of the peripheral unit.

BRIEF DESCRIPTION OF THE DRAWINGS

Now will be described an embodiment of the present invention by referring to the accompanying drawings, in which:

FIG. 2 is an embodiment of circuits which enable putting the present invention into operation;

DESCRIPTION OF PREFERRED EMBODIMENTS

Figure 1:
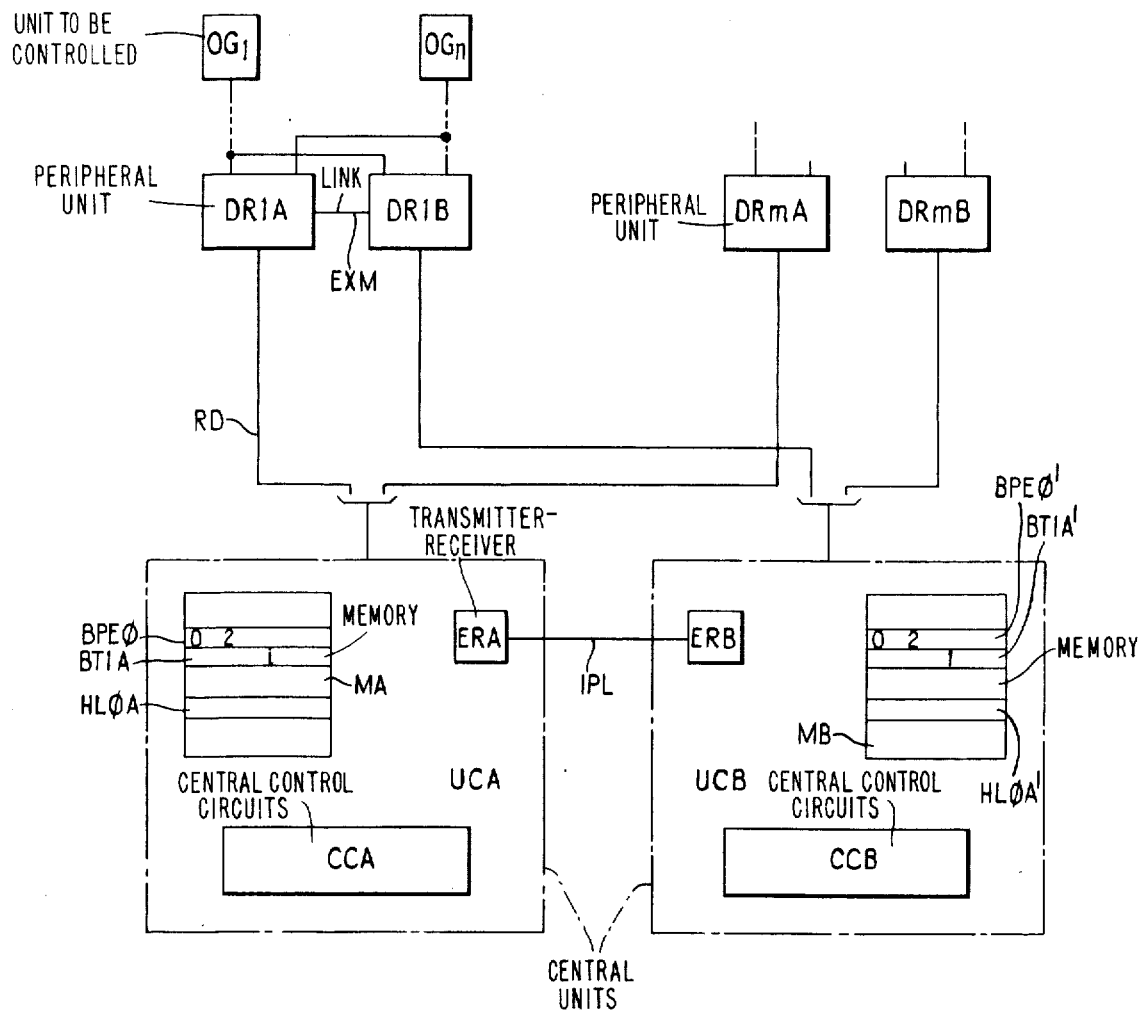
FIG. 1 is a block diagram of a data processing installation to which the present invention is applicable.

In referring to FIG. 1, there will first be described the block diagram of an installation wherein the present invention can be applied.

This installation comprises two central units UCA and UCB, several peripheral units DR1A to DRmB associated in pairs, as well as units to be controlled such as OG1 and OGn which can be the units of a telephone installation.

The central units UCA and UCB are connected by a transmission link IPL. In each central unit, at the end of that link IPL, there is provided a transmitter-receiver (ERA, ERB) enabling transmitting and receiving any information to the other central unit. Moreover, each central unit has control circuits (CCA, CCB) and a memory (MA, MB) made up of memory cells. In that memory, two cells are assigned to each peripheral unit and they contain various information concerning that unit. For instance, in the central unit UCA, the cells BPE$\phi$ and BT1A are assigned to the peripheral unit DR1A. Namely, in cell BPE$\phi$, the bit number 0 has a value 0 when no order has been transmitted to the peripheral unit DR1A. It is set on 1 when an order is transmitted to unit DR1A or when, unit UCA not having access to unit DR1A, an order is transmitted to central unit UCB so that this latter might retransmit it to DR1B. Bit number 2 has normally a value 0; it is set upon 1 when an order, received from central unit UCB, is transmitted to unit DR1A for execution. Cell BT1A contains a bit number $i$ which has for value 1 when the central unit UCA has access to the peripheral unit DR1A, and which has for value 0 in the contrary case. Memory MA also has, for each peripheral unit, cells such as HL$\phi$A for DR1A, containing orders to transmit to that unit.

A peripheral unit, say for instance DR1A, has as a function to receive control orders from the central unit UCA and to retransmit them to the controlled units OG1 to OGn. It is duplicated by the peripheral unit DR1B which receives orders from the central unit UCB and retransmits them to those same controlled units OG1 to OGn.

Two associated peripheral units such as DR1A and DR1B are connected by a link EXM and possess a mutual exclusion system enabling the control of a controlled unit only for one central unit at a time. This system — not shown in the figure — is such that as long as the two peripheral units do not operate they would transmit at regular intervals impulses, so-called interruption signals, onto the central units UCA and UCB respectively. Immediately a peripheral unit, say for instance DR1A, receives an order from its central unit UCA, it blocks the operation of the other peripheral unit DR1B and controls the execution of the order. When the order is executed, the peripheral unit DR1A sends an "end of job" signal to the central unit UCA and releases the operation of the peripheral unit DR1B which will then be able to execute an order blocking the operation of the peripheral unit DR1A. The central unit UCA undertakes every operation resulting from that "end of job" and transmits to unit DR1A a next order to be executed. Unit DR1A will execute that order as soon as it is released.

In referring to FIG. 1, there will now be described the general operating process of an embodiment of the data transfer system to the present invention and more particularly the operating process of the central unit UCA.

It will first be assumed that the two central units UCA and UCB have access to peripheral units DR1A and DR1B respectively. Peripheral unit DR1A is released and has not received any order to be executed. Central unit UCA has in its memory cells, such as HLφA, at least one order to be executed.

In memory MA the bits 0 and 2 of cell BPEφ have a value 0, and, the bit $i$ of BT1A has a value 1.

When central unit UCA receives an interruption signal from peripheral unit DR1A, the control circuits CCA will identify this unit. With the help of the obtained identity, they will read the contents of the memory cell BPEφ assigned to unit DR1A. They will test the value of bit 0 of BPEφ and will deduce therefrom — since its value is 0 — that unit DR1A has not any order to be executed. Circuits CCA will insure that there exists in a memory cell HLφA, and then will insure that bit $i$ of BT1A has a value 1 signifying that unit UCA has access to unit DR1A. They will then control the transmission of the order to peripheral unit DR1A and will set the bit 0 of BPEφ to the value 1.

When the transmitted order has been executed, unit DR1A transmits again an interruption signal to central unit UCA. Circuits CCA identify the unit DR1A and consult, in the same way as before, the value of bit 0 of BPEφ. This value being 1, the circuits CCA deduce therefore that an order previously transmitted to DR1A has been executed. The circuits CCA will then consult the value of bit 2 of BPEφ. This value being 0, they will deduce that the executed order, transmitted by unit UCA, was executed for its own account and not for the account of unit UCB. The content of the cells, such as HLφA, is set up to date and bits 0 and 2 of BPEφ are restored to 0. Then, circuits CCA will insure that there is in a memory cell HLφA an order to have executed by DR1A, and the operation proceeds as was described above.

It will now be assumed that a central unit, say UCA for instance, does not have access to its peripheral unit DR1A, bit $i$ of BT1A has for value 0. The central unit has, nevertheless, orders to transmit to DR1A. The control circuits CCA generate at regular intervals, with the help of means which are not within the scope of the present invention, a signal which acts as an interruption signal. The same operating process as above is undertaken until the circuits CCA consult the value of the bit $i$ of BT1A. At that instant, this value being 0, the circuits CCA will control the transmission through link IPL, to central unit UCB, of a message identifying the peripheral unit (DR1A) and the order to be executed.

Central unit UCB receives this message. Subsequently, in response to the reception of an interruption signal from unit DR1B, it will transmit the message to the peripheral DR1B as described above. Moreover, circuits CCB set the bit 2 of BPEφ' to the value 1. When unit DR1B finishes executing the order, it transmits an interruption signal to the central unit UCB.

Circuits CCB accomplish the same functions as those accomplished previously by circuits CCA. However, since bit 2 of BPEφ' has for value 1, they deduce that the executed order, transmitted by UCB, was executed for the account of UCA. Circuits CCB will then transmit to the central unit UCA, through link IPL, a message identifying the order processed and indicating that it has been executed. Unit UCB proceeds with the execution of another function.

Receiving this message, the central unit UCA sets up to date the contents of its memory MA. It then examines whether it has another order to have executed by DR1A. If so, it transmits it as before to unit UCB; if not, it goes on with the execution of another function.

By referring to FIGS. 2 to 5, the description will be given of a detailed embodiment of the system in the present invention.

FIG. 2 is a simplified diagram of the circuits of a central unit (UCA) making it possible to set into operation the system in present invention.

These circuits include a processing unit CCA and a memory ME. The processing unit CCA comprises mainly:

a main register A
an auxiliary register B
an index register X
an address register Y
a memory register M
a code register F
a program counter CP
a decoder DEC
a logic and arithmetic unit Add
control circuits CC.

Memory ME is made up of memory cells provided for storing data (cells BPEφ to HLφA) and instructions INS1 to INSn. Each memory cell is provided for storing 16 bits numbered from 0 to 15.

There are available as many address cells BPEφ, BPE3 and HLφ as there are peripheral units such as DR1A. It will be assumed here that cells BPEφ, BPE3 and HLφ are assigned to the peripheral unit DR1A. Address BPEφ corresponds to the identity of unit DR1A. Addresses BPE3 and HLφ are obtained from BPEφ by the increase of one and four units respectively.

In cell BPEφ, only bits 0, 1, 2 and 4 are used within the scope of the following description. Bits 0 and 2 have the meanings which are provided above in the description of FIG. 1. Bit 1 is set upon 1 when an order is put into waiting condition in memory ME for the account of central unit UCB. Bit 4 is set upon 1 when central unit UCA transmits an order to central unit UCB which undertakes to retransmit it to the peripheral unit DR1B.

Cell BPE3 helps to store an order received from central unit UCB and to transmit to the peripheral unit DR1A.

Cell BT1A includes one bit per each peripheral unit (DR1A) associated with UCA. A bit of value 1 means that the corresponding unit is accessible by central unit UCA. Suppose bit $i$ corresponds to peripheral unit DR1A.

Cell BT1B also includes one bit per each peripheral unit (DR1B) associated with UCB. A bit of value 1 means that the corresponding unit is accessible by central unit UCB. Suppose bit $i$ corresponds to peripheral unit DR1B.

Cell HLφA belongs to a series of cells making up a waiting queue wherein are stored the orders to be transmitted to a peripheral unit. Cell HLφ contains the address of a cell such as HLφA. There are as many cells HLφ and waiting queues as there are peripheral units.

Since operation control of these waiting queues is currently well known, it will be considered here, for simplification purposes, that contents of HL0 are reduced by one unit each time that a cell from the waiting queues is read. When the waiting queues are empty, the content of HL0 is null.

An instruction, say for instance INS1, is made up of a 7-bit instruction code CI and of a 9-bit address AR.

The program counter CP contains at every instant the address of an instruction cell INS1 to INS$n$. Under the control of circuits CC, the contents of CP are transferred into the register Y and the instruction cell corresponding to this address is read. The instruction code (CI) is stored in register F and the address (AR) is stored in register M. The instruction code CI is decoded by decoder DEC. This latter provides, in response, on its outputs, control signals for controlling various operations of the circuits CC and of the block Add. It can control the transfer onto one of the registers A, B or X — or the reverse — of the contents of a cell in memory ME whose address is deduced from the address contained in register M (9 bits address AR contained in the instruction) by combination with the contents of the index register X. It can control the permutation of the contents of registers A and B. It can control the examination, by block Add, of the value (0 or 1) of a bit of register A whose rank (0 to 15) is contained in the address part of the instruction, and, control according to the result of the examination, the stepping of counter CP onto a determined position. Finally, it can enable detecting that the value of all the bits of register A is 0, and, according to the case, also control the stepping of counter CP onto a determined position.

The instructions stored in memory ME are changed to ones after the others by the stepping of counter CP under the control of circuits CC at the execution of each one of them. Nevertheless, some instructions can be skipped, by the stepping of counter CP, in the course of instructions having for purpose, as was already seen above, the examination of bits of register A.

Figure 3:
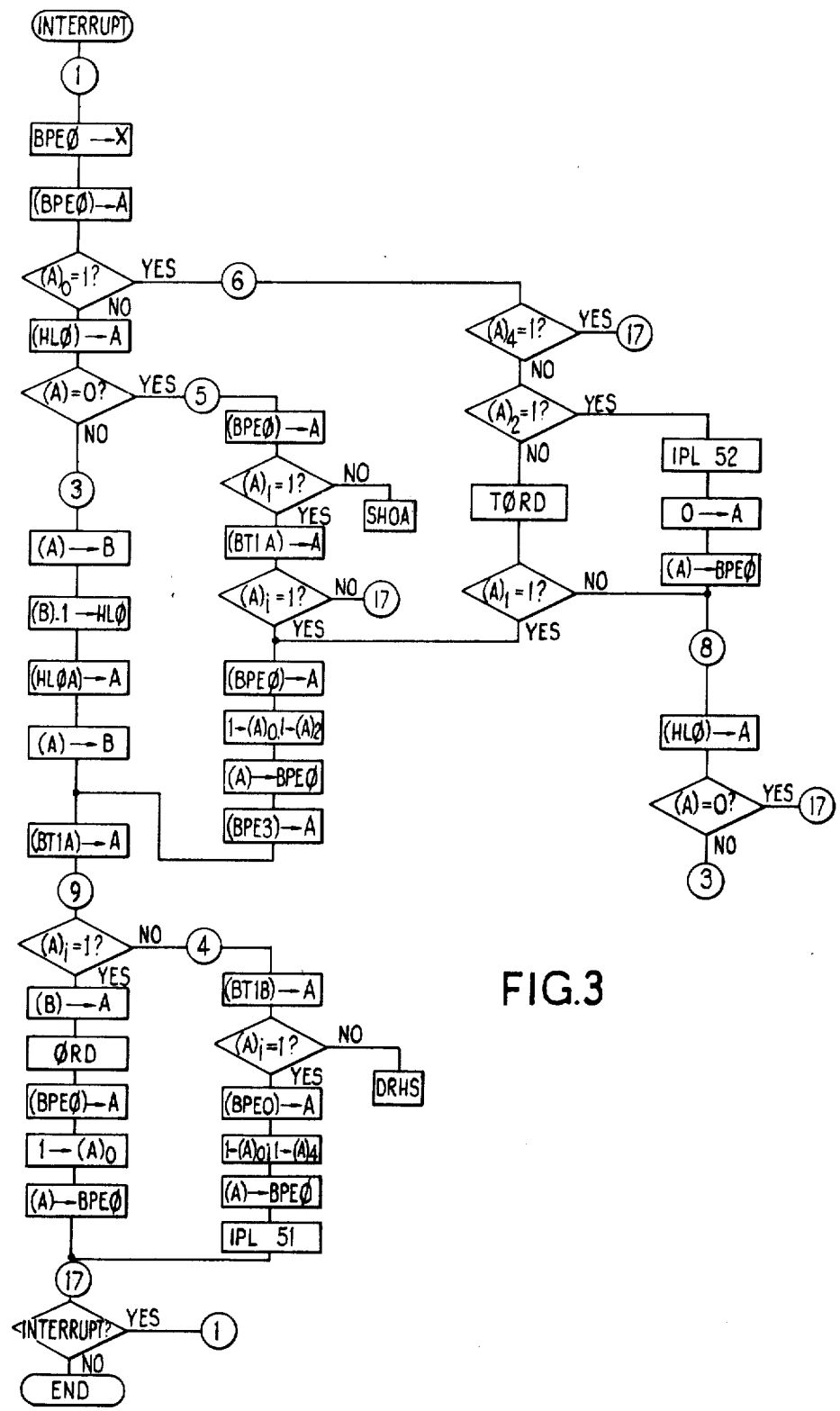
FIGS. 3, 4 and 5, are flow-charts illustrating the operation of the circuits in FIG. 2.
Figure 4:
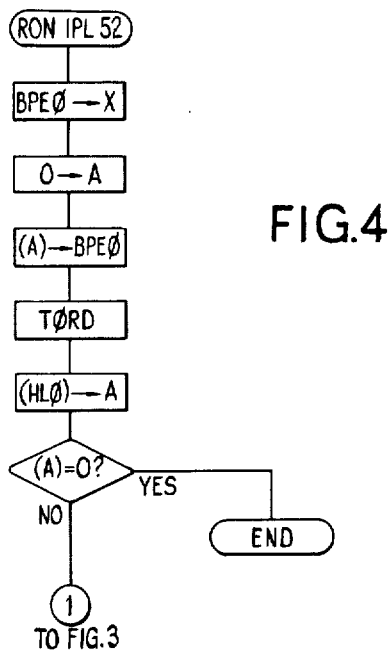

The flow-chart in FIG. 4 illustrates the operating process of the circuits in FIG. 3. The indications noted on that flow-chart correspond each to a phase of operation in relation to information contained in the data memory cells and in the registers A, B and X. It is worth noting that an indication, contained in a rectangle corresponds to a phase of transfer-of-information between registers or between memories and registers; or else, to a phase of modification of contents of the registers. An indication such as "BPE$\phi$ → X" means that the information BPE$\phi$ is stored in the register X. An indication "(BPE$\phi$) → A" means that the information contained in the address cell BPE$\phi$ is being read and then transferred into register A. And, inversely, the indication "(A) → BPE$\phi$" means that the information contained in register A is transferred into the address memory cell BPE0. Finally, the indication "1 → (A)$_0$" means that the bit 0 of register A is set to 1.

The indications contained in the diamond-shaped areas correspond to phases of examination of values of the bits of register A or of the entire value of the contents of register A. The indication "(A)$_0$ = 1?", for instance, means that there is being examined whether bit 0 of register A has 1 for value. The indication "(A) = 0?" means that there is being examined whether the entire contents of register A has 0 for value. The circles containing reference numbers of same value are supposed to be linked one to another. From this flow-chart, it will therefore be easy to reconstitute all the instructions enabling the setting into operation of the system in FIG. 1. This flow-chart might also give place, in a wired embodiment, to a sequential stepping in the manner of counter CP and providing various control order to the circuits in FIG. 2. Description will therefore be given here of the circuits in FIG. 2, with reference mainly to the flow-chart in FIG. 3.

It will be assumed initially that the two central units UCA and UCB have access each to their respective peripheral units DR1A and DR1B; bits $i$ of cells BT1A and BT1B have therefore the value 1. Having access to unit DR1A, the central unit UCA has not therefore transmitted any order to central unit UCB; and bit 4 of cell BPE$\phi$ has therefore for value 0. Unit UCA has not any order in course of execution by DR1A; bits 0 and 2 of cell BPE$\phi$ have the value 0. Finally, unit UCA has no job awaiting for transmission to DR1A for the account of unit UCB and bit 1 of cell BPE$\phi$ has the value 0. Whereas, unit UCA has an order waiting in a cell, such as HL0A, of its queuing file; the contents of HL$\phi$ are therefore different from 0 and has, for instance, the value HL$\phi$A.

When unit UCA receives an interruption signal INT from the peripheral unit DR1A, the circuits CC will — during the phase which is noted "INTERRUPT" in FIG. 3, and through means not shown in that figure — control the identification of the calling peripheral unit. They deduce therefrom the address BPE$\phi$ of the memory cell BPE$\phi$ and store it in the register X wherein it will be held during the entire processing that follows (phase "BPE$\phi$ → X"). Under the control of circuits CC, the address memory cell BPE$\phi$ is read. Its contents is stored in the register A (phase "(BPE$\phi$) → A"). The block Add will then analyse the value of bit 0 of the information BPE$\phi$ contained in A (phase "(A)$_0$ = 1?"). Since this bit has the value 0, it means then that the calling peripheral unit DR1A had no order to execute. The interruption signal provided by the peripheral unit DR1A therefore simply corresponds to a request for a job. On the flow-chart in FIG. 4, the operation of the system is routed onto the branch "No" originated from the diamond-shaped square containing the indication (A)$_0$ = 1?.

Contents HL$\phi$A of memory cell HL$\phi$ is then read and is stored into register A (phase "(HL$\phi$) → A"). Contents of register A is examined. Its contents being different from zero, it means that a job is in awaitance in the unit UCA for its own account. The operation of the system is routed onto branch "No" originated from the diamond-shaped square containing the indication (A) = 0?.

The contents of A is transferred into B (phase (A) → B). Then, the contents of B, reduced by one unit, is transferred into cell HL$\phi$ so as to provide the address of a next cell of the waiting queue (phase (B)-1 → HL$\phi$).

Memory cell HL$\phi$A, whose address has been held in A, is read. Its contents is transferred into A, and this is noted (HL$\phi$A) → A on the flow-chart of FIG. 4. The contents of A is then transferred into B. The contents of the memory cell BT1A is read and is stored into A. From the address BPE$\phi$ held in X, a bit of a determined rank — say $i$ for instance — of the register A is being examined (phase "(A)$_i$ = 1?"). The central unit UCA having access to the peripheral DR1A, the examined bit has therefore for value 1. The operation is routed onto the branch "Yes" of the diamond-shaped square "$(A)_i = 1?$" in FIG. 4. The contents of B (order $\phi$rd) is transferred into A (phase "(B) → A"). At the next phase ($\phi$rd), the order $\phi$rd contained in A is sent upon link RD onto the peripheral DR1A. The contents of cell BPE$\phi$ is then read and stored into the register (phase (BPE$\phi$) → A). The bit 0 of A is set upon 1 (phase 1 → $(A)_0$). The contents of A is then stored again into BPE$\phi$ (phase "(A) → BPE$\phi$"). The central unit UCA will then examine (phase "INTERRUPT") whether there is another interruption originating from a peripheral unit. If so, the operation is resumed as from mark 1 in order to process this interruption. If not, the central unit is made available (phase "END") in order to accomplish any other function which is not within the scope of present invention.

It will now be assumed that both central units UCA and UCB having still access to their peripheral units DR1A and DR1B; and, central unit UCA, having sent an order to the peripheral unit DR1A, this latter will terminate the execution of the order. Bits $i$ of memory cells BT1A and BT1B have for value 1. Bit 0 of memory cell BPE$\phi$ has for value 1. Bits 1, 2 and 4 of memory cell BPE$\phi$ have for value 0.

When peripheral unit DR1A has executed the order transmitted by unit UCA, it transmits an interruption signal to unit UCA. This latter identifies the peripheral unit DR1A and stores its identity BPE$\phi$ into the register X (mark 1). The contents of cell BPE$\phi$ is read and stored into A (phase "BPE$\phi$ A"). Value of the bit 0 of A is examined (phase "$(A)_0 = 1?$"). This value being 1, it means that the unit DR1A has had an order to execute; this is therefore the case of an end of job of the peripheral unit DR1A, and the operation of the system is routed onto mark 6.

The bit 4 of register A is analysed (phase "$(A)_4 = 1?$"). Its value being 0, since the central unit UCA has transmitted the preceding order to DR1A (and not to central unit UCB), the operation is routed onto branch "No" originated from the diamond-shaped square corresponding to the present phase.

Bit 2 of register A is then analysed (phase "$(A)_2 = 1?$"). Its value being null since the central unit UCA has transmitted the preceding order for its own account, the operation is routed onto the phase "T$\phi$RD" of the end of job processing during which the contents of memory ME is set up to date in accordance with the executed order.

Then, bit 1 of register A is analysed (phase "$(A)_1 = 1?$"). Its value is supposed to be null, and this means that unit UCA has no job in awaitance originating from unit UCB. The operation is routed onto mark 8. Contents of cell (HL$\phi$) is read and is transferred into A (phase "(HL$\phi$) → A"). Contents of A is examined. If its contents is null, it means that unit UCA has no job in awaitance to be executed by unit DR1A. The operation is routed onto mark 17 and proceeds by the searching of another interruption (phase "INTERRUPT") as described above. If its value is different from 0, it means that the unit UCA has an order to be executed for unit DR1A and the contents of A provides the address of a cell such as HL$\phi$A. The operation is routed onto mark 3 and proceeds as described above.

Therefore, the operating process of the present system has been described above only in the case of a normal putting of the system into operation wherein both central units have each access to their peripheral units DR1A and DR1B. The central unit UCA has transmitted an order to unit DR1A and has been informed that the order was executed.

As from the above description, there will now be described process of operating cases resulting from the non-accessibility of a central unit to one of its peripheral units.

First it will be assumed that a central unit, UCA for instance, has not access to its peripheral unit DR1A and has nevertheless an order to transmit to it. The central unit UCB has access to its peripheral unit DR1B. Bits $i$, of cells BT1A and BT1B, have therefore for value 0 and 1 respectively.

When an interruption signal is originated in central unit UCA, this latter accomplishes the same operation as that described above, either by considering that this is the case of a job request or that it is the case of an end of work; and this, up to the mark 9. Indeed, at phase "$(A)_i = 1?$", the value of bit $i$ of register A (bit $i$ of contents of BT1A) is being analysed. That value is 0, the operation is therefore routed onto mark 4. Contents of BT1B is read and transferred into A (phase "(BT1B → A"). The value of bit $i$ of register A is analysed. Its value is 1 since central unit UCB has access to unit DR1B. Contents of BPE$\phi$ is then read and transferred into A (phase "(BPE$\phi$) → A"). Bits 0 and 4 of register A are set upon 1 (phase "1 → $(A)_0$; 1 → $(A)_4$); this will indicate subsequently that an order was transmitted by unit UCA to unit UCB. Indeed, after transfer of the contents of A into cell BPE$\phi$ (phase "(A) → BPE$\phi$"), a message, so-called message IPL51, containing the identity (BPE$\phi$) of peripheral unit DR1A and the order to be transmitted to it, is elaborated, and, is sent to central unit UCB through the link IPL (phase "IPL51"). Operation of central unit UCA returns then to mark 17 and proceeds as already described above.

It will now be assumed that central unit UCB has not access to the peripheral unit DR1B and has nevertheless an order to transmit to it, whereas central unit UCA has access to peripheral unit DR1A. Bits $i$ of memory cells BT1A and BT1B have for value 1 and 0 respectively. Bit 1 of memory cell BPE$\phi$ has for value 1. The value of the other bits of the memory cell BPE$\phi$ are of little importance within the scope of the present process-of-operation. Central unit UCB performs the operation described above and transmits a message IPL51 to central unit UCA. This message comprises the identity BPE$\phi$ of units DR1A and DR1B and an order $\phi$rd to be transmitted.

Figure 5:
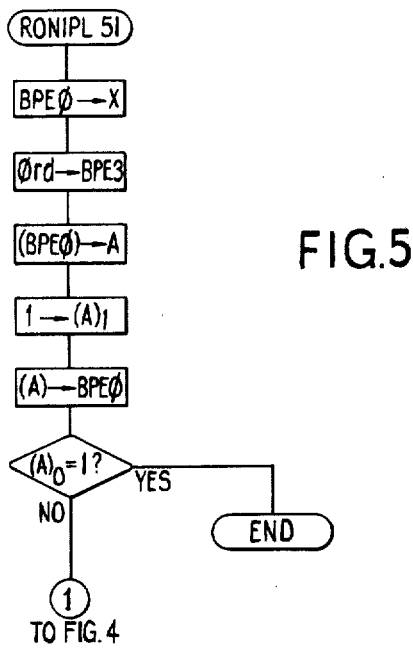

Central unit UCA receives the message IPL51 (phase "RON IPL51" on the flow-chart in FIG. 5). The identity BPE$\phi$ is stored into register X and the order $\phi$rd is stored into the memory cell BPE3 (phase "BPE$\phi$ → X" and "$\phi$rd → BPE3"). Contents of BPE$\phi$ is then read and transferred into register A (phase "BPE$\phi$ → A")). Bit 1 of register A is set upon 1 (phase "1 → $(A)_1$") and this will indicate, subsequently, that an order is in awaitance for the account of unit UCB. Contents of A is then transferred into cell BPE$\phi$ (phase "(A) → BPE$\phi$"). Moreover, bit 0 of register A is analysed. If its value is 1, it means that central unit UCA has provided an order to unit DR1A. It cannot therefore consider to provide another one as long as the preceding one is not terminated. Central unit UCA is made available for accomplishing another function. The sending of the order received from UCB will be described subsequently.

If bit 0 of A has for value 0, it means that the central unit has no job in course of execution by the peripheral DR1A. It will therefore proceed with the transmission of an order. Operation of the system is resumed as from mark 1 in FIG 3, and, it reproduces itself as described above.

It will be assumed, moreover, that unit UCA has no order to send to unit DR1A. Contents of HL$\phi$ is therefore null and, at phase "(A)=0?" in FIG. 3, the operation is routed onto mark 5.

Contents of BPE$\phi$ is transferred into A (phase "BPE$\phi \rightarrow$ A"). Bit 1 of the read information is examined (phase "(A)$_1$=1?"). This value is 1 and the operation is routed onto branch "yes" of the diamond-shaped square corresponding to the present phase. Moreover, if that value were 0, unit UCA would conclude that this is a case of incompatibility since, having brought about the course-of-processing of a job request it must evidently have at least one order in awaitance and unit UCA would pass onto phase SHOA, during which, this case is being processed by means outside the scope of present invention. Being routed onto branch "yes" of the diamond-shaped square containing the indication "(A)$_1$=1?", at the next phase "(BT1A $\rightarrow$ A", the contents of BT1A is transferred into register A. Bit $i$ of A is analysed. Having assumed that unit UCA has access to unit DR1A, the value of bit $i$ is therefore 1. It is worth noting, meanwhile, that if this value were 0, the unit UCA would not have access to the unit DR1A and the operation would be routed onto mark 17 and the searching of another interruption.

In next phase "(BPE$\phi$)$\rightarrow$ A", the contents of cell BPE0 is transferred into register A. Then, in the register A, bits 0 and 2 receive each the value 1 (phase "1 $\rightarrow$ (A)$_0$; 1 $\rightarrow$ (A)$_2$"). Finally (phase "(A) $\rightarrow$ BPE$\phi$"), the contents of register A is restored into cell BPE$\phi$. The contents of cell BPE$\phi$ is thus set up to date so as to indicate subsequently that an order has been transmitted to unit DR1A (1$\rightarrow$(A)$_0$) for the account of the other central unit UCB (1$\rightarrow$(A)$_2$). Indeed, order $\phi$rd contained in cell BPE3 is transferred into register A (phase "(BPE3)$\rightarrow$ A"); then is considered again the operating process described above during which the order is transmitted to unit DR1A.

Now will be considered the case where central unit UCB has not access to the peripheral unit DR1B. Central unit UCA has access to peripheral unit DR1A. The central unit UCB has transmitted an order to central unit UCA which has retransmitted it to peripheral unit DR1A. Bits $i$ of the memory cell BT1A and BT1B have for value 1 and 0 respectively. Bits 0 and 2 of memory cell BPE0 have for value 1, and bit 4 has for value 0.

When unit DR1A has executed the order, it transmits an interruption signal to unit UCA. Receiving this signal, unit UCA, after identification of unit DR1A, consults the value of bit 0 of cell BPE$\phi$ (phase "(A)$_0$= 1?"); that value is 1. Unit UCA therefore consults the value of bit 4 of the same information (phase "(A)$_4$ = 1?") and ascertains that this value is 0. It consults, at last, the value of bit 2 (phase "(A)$_2$ = 1?") and ascertains that the value is 1; this causes the transmission of a message, so-called message IPL52, to the central unit UCB (phase "IPL52"). This message comprises the identity BPE$\phi$ of unit DR1A and an indication of end-of-order execution. The contents of register A is restored to zero (phase "0 $\rightarrow$ A") and the contents of register A is transferred into cell BPE$\phi$, which amounts to setting to zero the contents of that cell.

Then, the operation proceeds onto the mark 8 as described above.

Now will be described the operating process proceeding from the reception of a message IPL52 in a central unit, say UCA for instance.

It is therefore assumed that unit UCA, not having access to unit DR1A, has transmitted an order, through message IPL51, to unit UCB. Unit UCB has transmitted the order to unit DR1B which has executed it; and unit UCB has then informed of it unit UCA by the transmission of a message IPL52.

Unit UCA therefore receives a message IPL52 during the phase noted "RON IPL52" in FIG. 4. The indication BPE$\phi$ contained in that message is stored into the register X. Contents of A is restored to zero (phase "0 $\rightarrow$ A") and then is transferred into cell BPE$\phi$ (phase "(BPE$\phi$)$\rightarrow$ A"), and this cancels the contents of cell BPE$\phi$. Then, during a phase "$\phi$RD" of end-of-work processing, the contents of memory ME is set up to date according to the order executed through means not within the scope of present invention.

Contents of cell HL$\phi$ is then transferred into register A (phase "(HL$\phi$)$\rightarrow$ A"); and the contents of register A is examined. If this contents is null, the unit UCA has no order to have executed by unit DR1A. The operation is routed onto phase "END", releasing the unit UCA for the accomplishment of another function. If the contents of register A is not null, the operation is routed onto the mark 1 in FIG. 3 and proceeds as desbrided above by taking into account that the contents of cell BPE$\phi$ is null.

Therefore it is seen that the information contained in the memory cell BPE$\phi$, BPE3, BT1A, BT1B, HL$\phi$, HL$\phi$A, associated with means for setting up to date and means for analysing their respective contents, do indeed enable the central unit to control the execution of an order in a controlled unit even if it has not access to its intermediate peripheral unit. It is simply necessary that the other central unit should itself have access to its own peripheral unit. The information contained in the memory cells of a central unit (UCA) and associated with a peripheral unit (DR1A) enable knowing, namely, whether this central unit (UCA) as well as the other central unit (UCB) have access to their respective peripheral units (DR1A and DR1B) and, whether an order received from the other central unit (UCB) has been transmitted to the peripheral unit (DR1A) and is in course of execution, and, whether an order has been transmitted to the other central unit (UCB) for being transmitted to the peripheral unit (DR1B). Consulting this information in memory determines the transmission of an order to the peripheral unit, or, the transmission of a message (IPL51 or IPL52) to the other central unit for communicating an order to be executed or for signalling the end of execution of an order received previously from that other central unit for communicating an order to be executed or for signalling the end of execution of an order received previously from that other central unit.

On the other hand, when a central unit, UCB for instance, has not access to its peripheral unit DR1B, the adequate arrangement of the tests of information contained in memory enables the other central unit UCA to alternate the sending of orders to its peripheral unit DR1A for its own account, and, for the accunt of unit UCB. Indeed, when central unit UCA ascertains that its peripheral unit DR1A has executed an order which it had previously transmitted to it for the account of the other central unit, it sends to it preferably — in as much as there is one in awaitance (test of contents of HL0, mark 8) — an order for its own account. Whereas, when the order has been transmitted and executed for its own account, it sends to it, preferably - in as much as there is one in awaitance (phase "$(A)_1 = 1$?") - an order for the account of the other central unit UCA by accomplishing the phases $BPE\phi \rightarrow A, 1 \rightarrow (A)_0; 1 \rightarrow (A)_2; (A) \rightarrow BPE\phi$, etc. such as described above.

It is understood that the foregoing description of a specific embodiment of this invention is made by way of non-limiting example only and is not to be considered as a limitation on its scope.

We claim:

1. A system enabling the transfer of data between central units and controlled units comprising at least two central units, a plurality of groups of controlled units, a plurality of peripheral units including one peripheral unit per group of controlled units and per central unit, means connecting said peripheral unit to receive orders from the central units and retransmit them to the controlled units; means linking the two central units including an information-transmission link, each central unit including central control circuits, each central unit including a first storing device for each peripheral unit assigned to the central unit for storing information indicating whether the corresponding periperal unit is accessible by the central unit or not; whereby when a central unit is preparing to transmit an order to a peripheral unit, the central control circuits read the information provided by the first storing device corresponding to the peripheral unit and, according to the read information, control either the transmission of the order directly to the peripheral unit, or the transmission to the other central unit, through the transmission-link, of a message containing the order and the identity of the peripheral units, each central unit including a second storing device for every periperal unit assigned to the other central unit for storing information indicating whether the other central unit has access to that peripheral unit; means arranged so that when a central unit has an order to transmit to a group of controlled units, but lacks access to its peripheral unit, the central control circuits read the information contained in the second storing device corresponding to the analogous peripheral unit of the other central unit and, according to the read information, they enable the transmission of the order to the other central unit, through the transmission-link, each central unit including a third storing device for every peripheral unit assigned to the central unit for storing characteristic information when the central unit transmits, for the account of the other central unit, an order to the peripheral unit; the central control circuits examining, at the end of the execution of an order by the peripheral, the information contained in the third storing device, which will then enable it to determine whether the order has been executed for its own account or for the account of the other central unit; and, in this latter case, the central control circuits transmit to the other central unit, through the transmission link, a message informing of the end of execution of the order.

2. The invention as claimed in claim 1, in which each central unit includes a fourth storing device for every peripheral unit assigned to the central unit for storing a characteristic information when the central unit transmits an order to the other central unit through the transmission link; the central control circuits examining, at the end of the execution of an order by the peripheral, the information contained in the fourth storing device; which then enables it to know whether the order has been transmitted onto the units control by the other central unit.

3. The invention as claimed in claim 2, in which each central unit includes a fifth storing device for every peripheral unit assigned to the central unit for storing a characteristic information when the central unit has a job in awaitance to have executed for its own account, characterized in that each central unit comprises a sixth storing device per every peripheral unit assigned to the central unit for storing a characteristic information when the central unit has a job in awaitance to have executed for the account of the other central unit; these various means being so arranged that when a job has been executed by a peripheral unit, under control of a first central unit, for the account of the second central unit, the first central unit would consult the information contained in the fifth storing device so as to transmit in priority an order for its own account; and, that when a job has been executed for its own account, it would consult the information contained in the sixth storing device so as to transmit in priority an order for the account of the second central unit.

* * * * *